United States Patent [19]

Wagner

[11] Patent Number: 5,055,600

[45] Date of Patent: Oct. 8, 1991

[54] GLYCIDYL AZIDE POLYMER (GAP) SYNTHESIS BY MOLTEN SALT METHOD

[75] Inventor: Ross I. Wagner, Woodland Hills, Calif.

[73] Assignee: Rockwell International Corporation, El Segundo, Calif.

[21] Appl. No.: 514,629

[22] Filed: Apr. 24, 1990

[51] Int. Cl.$^5$ ............................................. C07C 247/04
[52] U.S. Cl. ....................................................... 552/11
[58] Field of Search ........................................... 552/11

[56] References Cited

U.S. PATENT DOCUMENTS

| | | | |
|---|---|---|---|
| 4,268,450 | 5/1981 | Frankel et al. | 260/349 |
| 4,781,861 | 11/1988 | Wilson et al. | 552/11 |
| 4,891,438 | 1/1990 | Ahad | 552/11 |
| 4,937,361 | 6/1990 | Wagner et al. | 552/11 |

Primary Examiner—Joseph Paul Brust
Attorney, Agent, or Firm—H. Fredrick Hamann; Harry B. Field; David C. Faulkner

[57] ABSTRACT

A solvent-free molten salt method for the synthesis of glycidyl azide polymer.

3 Claims, No Drawings

5,055,600

GLYCIDYL AZIDE POLYMER (GAP) SYNTHESIS BY MOLTEN SALT METHOD

STATEMENT OF GOVERNMENT INTEREST

The Government has rights in this invention pursuant to Contract (or Grant) No. F33615-89-C-5713 awarded by the U.S. Department of the Air Force.

FIELD OF THE INVENTION

The present invention relates to a solvent-free process for the preparation of glycidyl azide polymers (GAP).

DESCRIPTION OF RELATED ART

Methods heretofore utilized in the preparation of energetic hydroxy-terminated azido polymers are disclosed in U.S. Pat. No. 4,268,450 and pending U.S. patent application Ser. No. 07/305,033 filed Feb. 2, 1989, now U.S. Pat. No. 4,937,361, patented 06-26-90.

In U.S. Pat. No. 4,268,450 an azido polymer is prepared by admixing polyepichlorohydrin (PECH) with sodium azide in an appropriate polar organic solvent such as dimethylformamide (DMF) or dimethylsulfoxide (DMSO).

The aforementioned patent application Ser. No. 07/305,033 defines a method of producing a hydroxy-terminated aliphatic polyether utilizing a mixture of polyepichlorohydrin and sodium azide in DMSO, and a catalyst selected from the group consisting of methyltrioctyl ammonium chloride, dodecyltrimethyl ammonium chloride, lithium chloride, and the like.

Both of the above processes utilize a solvent for producing the azide polyether. The present invention, while contemplating the production of a polyether having a general structural formula such as described in U.S. Pat. No. 4,268,450, utilizes a solvent-free system and molten salt method for the manufacture of glycidyl azide polymer.

SUMMARY OF THE INVENTION

There is provided by the present invention a new solvent-free molten salt method for the preparation of compounds having the general formula:

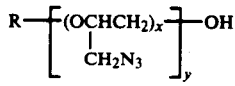

wherein x is an integer having a value from about 10 to 60, y is an integer having a value from about 1 to 4, and R is the hydroxy-free residue of a monohydric alcohol, diol, triol, or polyol initiator.

The novel method for production is hereinafter set out in greater detail.

OBJECTS OF THE INVENTION

It is an object of the present invention to provide a new method of glycidyl azide polymer production.

It is yet another object of the invention to provide an improved method of polymer production utilizing a solvent-free system in which occurs reaction of a polyepichlorohydrin precursor with azide ions from quaternary ammonium azide salt compounds.

These and other objects of the present invention will be apparent from the following description of the preferred embodiment.

DESCRIPTION OF THE PREFERRED EMBODIMENT

In accordance with the present invention, the reaction rate for the polyepichlorohydrin to glycidyl azide polymer conversion is directly proportional to the concentrations of epichlorohydrin units in the polymer and azide ion. In state-of-the-art polyether processes, a significant slowing of the reaction rate occurs after about 90% conversion. This slowing, which more than doubles the reaction time predicted from the initial rate, is a consequence of the association of the metal cation (e.g., Na$^+$ or Li$^+$) of the azide salt with a solvent medium in which it has limited solubility. Release of solvent associated with solid metal azide salts, which dissolve as the reaction proceeds, results in an accelerated dilution of polyepichlorohydrin units over that resulting from reaction alone. The disclosed novel process entirely precludes both the azide salt solubility limitation and the metal cation-induced slowing of the reaction rate by elimination of reaction solvent and substitution of low-melting quaternary ammonium azide salts for alkali metal azides.

The hydroxy-terminated aliphatic polyether synthesized in accordance with the present invention has the following generic or general structural formula:

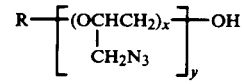

wherein x is an integer having a value from about 10 to 60; R is the hydroxy-free residue of a monohydric alcohol, diol, triol, or polyol initiator; and y is an integer having a value of 1 to about 4, indicative of the number of hydroxy groups present in the initiator.

For example, and without limitation, R may be $CH_2CH_2$, $CH_2CHCH_2$ and $C(CH_2)_4$ from $HOCH_2CH_2OH$, $HOCH_2CHOHCH_2OH$ and $C(CH_2OH)_4$, respectively, which are representative of initiator residues providing multifunctional azidoalkyl polymeric ethers.

In accordance with the method disclosed herein, which is two to three times faster than any known state-of-the-art process, the organically bound chlorine in the epichlorohydrin monomer units in polyepichlorohydrin react with an azide ion to produce a glycidyl azide monomer unit in glycidyl azide polymer according to the equation:

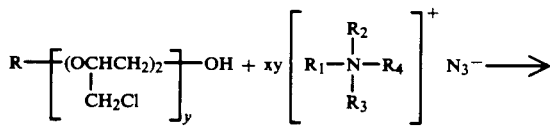

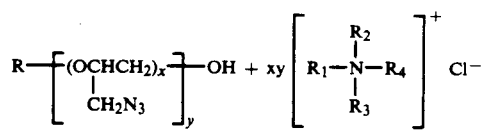

A liquid or molten quaternary ammonium azide:

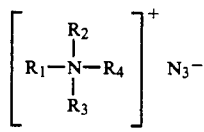

wherein $R_1$, $R_2$, $R_3$, and $R_4$ may be the same or different aliphatic radicals either straight chain, branched chain or aromatic substituted, and selected from the group comprised of the homologous series from methyl through octadecyl and benzyl, where said quaternary ammonium azide, having a melting point of about 80° C. to about 120° C., is used in a solvent-free system in lieu of a solution of an alkali metal azide, $NaN_3$ and/or $LiN_3$, in a solvent such as DMSO or DMF. It should be understood that the melting point range for the quaternary ammonium azide reactants given above does not exclude the use of quaternary ammonium azides such as methyltrioctylammonium azide having a melting point below ambient temperature (see Example 6 of Table 1).

More specifically, in accordance with the present invention, a molten salt method for the manufacture of glycidyl azide polymer comprises the following steps:

(1) in a suitable reaction vessel, providing azide ions from quaternary ammonium azide salt compounds having the general formula:

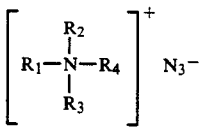

(2) combining the azide ions of step (1) with epichlorohydrin monomer units of polyepichlorohydrin;
(3) reacting the azide ions and epichlorohydrin monomer units in a solvent-free system according to the equation:

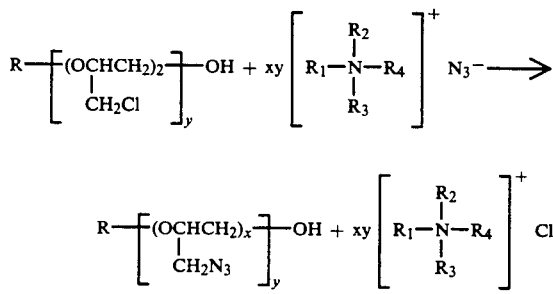

wherein x is an integer having a value from about 10 to 60; y is an integer having a value of 1 to about 4; R in the GAP product is the hydroxy-free residue of a monohydric alcohol, diol, triol, or polyol initiator; $R_1$, $R_2$, $R_3$, and $R_4$ are as defined above for the quaternary ammonium azide salt compounds; and (4) producing glycidyl azide polymer of the general formula:

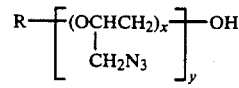

wherein x is an integer having a value from about 10 to 60, y is an integer having a value from 1 to about 4, and R is the hydroxy-free residue of a mono-hydric alcohol, diol, triol, or polyol initiator.

As exemplified more clearly below, the present process also anticipates that the azide ions are provided in molten quaternary ammonium salt hydrates derived from very hygroscopic quaternary ammonium azide salt compounds such as tetrabutylammonium azide (TBAA), methyltrioctylammonium azide, and benzyltriethylammonium azide (BTEAA), and the like. As a general rule, the melting points of quaternary ammonium salt hydrates are lower than the corresponding anhydrous quaternary ammonium salt.

By way of example, and without limitation, the improved method, according to the present invention, may best be understood by the following examples.

EXAMPLE 1

In a suitable reaction vessel, 0.3311 grams (1.164 mmols) of $Bu_4NN_3$ ($Bu=C_4H_9$) hydrated with 0.0224 grams (1.244 mmols) $H_2O$ was mixed with 0.0998 grams of polyepichlorohydrin (PECH) (0.996 meq. of epichlorohydrin monomer units) to give a homogeneous liquid. Differential scanning calorimetry (DCS) data obtained on 0.0015 grams of this liquid indicated that substitution of chlorine in the polyepichlorohydrin occurs to produce a glycidyl azide polymer, followed by sequential decomposition of the excess $Bu_4NN_3$ salt at about 208°–218° C. and the product GAP at about 226° C. The remainder of the reaction mixture was placed in a 100° C. oil bath for approximately one hour and then allowed to cool to ambient, followed by twice washing with 1 milliliter portions of $H_2O$ to remove by-product tetrabutylammonium chloride. The resulting product was dried utilizing a rotary evaporator at 0.15 torr and 58° C. and assayed by infrared analysis. The polyether exhibited an absorbence ratio of C-Cl/C-H=0.029/0.481=0.060, equivalent to 90.2% conversion of polyepichlorohydrin to glycidyl azide polymer as determined from a standard curve for absorbence ratio vs. conversion.

EXAMPLE 2

In this example, neat $Bu_4NN_3$ was reacted with neat polyepichlorohydrin (PECH) as follows:

In a suitable reaction vessel, under a gaseous nitrogen atmosphere, was admixed 0.6391 grams (2.246 mmols) of $Bu_4NN_3$ and 0.2010 grams (2.042 meq.) of polyepichlorohydrin (PECH). This mixture was immersed in an oil bath at 105° C. for about 0.33 hours. The resulting liquid product was washed three times with water and dried in a rotary evaporator to 0.2 torr and 68° C. Utilizing infrared spectrometry, the resulting C-Cl/C-H absorption ratio was 0.060/0.604=0.099, corresponding to 85.2% conversion of polyepichlorohydrin to glycidyl azide polymer.

EXAMPLE 3

An approximately equimolar mixture of $Bu_4NN_3$ (8.7411 grams, 30.72 mmols) and polyepichlorohydrin (PECH) (3.0236 grams, 30.78 meq.) was prepared as a very thick paste. Approximately 0.3 gram portions of this paste were placed in suitable reaction vessels which were simultaneously immersed in a 100° C. oil bath where the paste melted to form a homogeneous liquid and then were removed individually after varying periods of time. The resulting product was twice washed with water, dried under vacuum, and analyzed by infrared absorption analysis as described in Examples 1 and 2, above. The extent of conversion of the polyepichlorohydrin to glycidyl azide polymer determined as a function of time followed second order kinetics. The rate constant was 0.0018 liter/mol-sec.

EXAMPLE 4

To a molten stirred mass of $Bu_4NN_3$ (93.2 grams, 0.327 mol, m.p.=85° C.) in a suitable reaction vessel, was added 29.3 grams (0.298 eq.) polyepichlorohydrin (PECH) in the course of 35 minutes, after which time the temperature was raised to 105° C. Periodic sampling and analysis of the reaction mixture indicated that the conversion was virtually complete after 3 hours. The product GAP, after water washing twice and vacuum drying, was isolated in 98% yield.

Examples of the other preparation of glycidyl azide polymer (GAP) are listed in Table 1, below.

TABLE I

| EXAMPLE NO. | PECH, meq. | QUATERNARY AMMONIUM AZIDE, mmols | TEMP., °C. | TIME, Hrs | GAP YIELD, % |
|---|---|---|---|---|---|
| 5 | 10.4 | $(C_6H_5CH_2)(C_2H_5)_3NN_3$ 11.4 | 100 | 3.0 | 96.4 |
| 6 | 15.7 | $(CH_3)(C_8H_{17})_3NN_3$ 16.5 | 95 | 4.5 | 95.6 |
| 7 | 2.1 | $[2-(C_2H_5)C_6H_{12}](C_3H_7)_3NN_3$ 2.3 | 100 | 4.0 | 95.0 |
| 8 | 12.4 | $(C_3H_7)_3NN_3$ 15.3 (92%, hydrate) | 110 | 6.0 | 90.0 |
| 9 | 1.5 | $(C_6H_5CH_2)(CH_3)_2(C_{12}H_{25})NN_3$ 1.7 | 100 | 5.5 | 93.6 |

Obviously, numerous variations and modifications may be made without departing from the present invention. Accordingly, it should be clearly understood that the form of the present invention described above is illustrated only, and is not intended to limit the scope of this invention.

What is claimed is:

1. A molten salt method for the manufacture of glydicyl azide polymer comprising:
   (1) in a suitable reaction vessel, providing azide ions from molten state quaternary ammonium azide salt compounds having the general formula:

$$\left[ \begin{array}{c} R_2 \\ | \\ R_1-N-R_4 \\ | \\ R_3 \end{array} \right]^+ N_3^-$$

(2) combining the azide ions of step (1) with epichlorohydrin monomer units of polyepichlorohydrin;

(3) reacting the azide ions and epichlorohydrin monomer unit in a solvent-free system according to the equation:

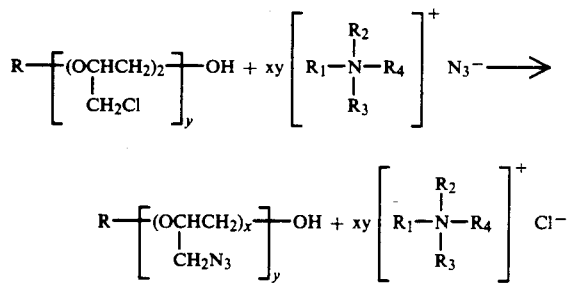

and;

(4) producing glycidyl azide polymer of the general formula:

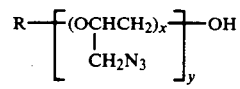

wherein x is an integer having a value of from about 10 to about 60, y is an integer having a value from 1 to 4, and R is the hydroxy-free residue of a monohydric alcohol, diol, triol, or tetraol initiator, $R_1$, $R_2$, $R_3$, and $R_4$ are selected from the group consisting of $C_1$ to $C_{18}$ alkyls such that the quaternary ammonium azides have a melting point of from about 80° C. to about 120° C., with the proviso that as depicted in the reaction of step 3, xy means x times y and that one of mol of the polymer in which x=60 and y=4 would require 240 moles of the quaternary ammonium salt compound to effect substitution of azide for chloride as defined by the equation of Step (3).

2. The method of claim 1 wherein the azide ions are provided as hydrated quaternary ammonium azides, such that the quaternary ammonium azides have a melting point less than 110° C.

3. The method of claim 1 wherein the azide ions and epichlorohydrin monomer units after combination are heated to a temperature of from 85° C. to 110° C.

* * * * *